United States Patent Office 3,360,522
Patented Dec. 26, 1967

3,360,522
3-BICYCLOALKYL-6-METHYLURACIL
Harvey M. Loux, Hockessin, Del., assignor to E. I. du Pont de Nemours and Company, Wilmington Del., a corporation of Delaware
No Drawing. Original application Oct. 29, 1962, Ser. No. 233,952, now Patent No. 3,235,361, dated Feb. 15, 1966. Divided and this application Dec. 27, 1965, Ser. No. 516,779
4 Claims. (Cl. 260—260)

This application is a division of copending application Ser. No. 233,952, filed Oct. 29, 1962, and now U.S. Patent No. 3,235,361, which in turn is a continuation-in-part of the following abandoned applications: application Ser. No. 167,434, filed Feb. 1, 1962; application Ser. No. 89,671, filed Feb. 16, 1961; application Ser. No. 12,967, filed Mar. 7, 1960; and application Ser. No. 833,705, filed Aug. 14, 1959.

This invention relates to novel 3,6-disubstituted uracils and various salts thereof. More particularly, this invention is directed to novel uracil compounds of the formula (1) 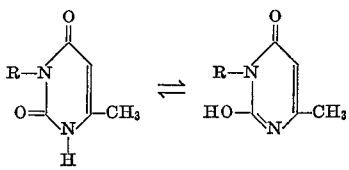

where:

R is a bicycloalkyl radical containing 7 through 12 carbon atoms, a bicycloalkenyl radical containing 7 through 12 carbon atoms, a bicycloalkyl alkyl radical containing 8 through 13 carbon atoms or a bicycloalkenyl alkyl radical containing 8 through 13 carbon atoms.

Also included within the invention are salts of the uracils of Formula 1 formed with such cations as sodium, potassium, lithium, and quaternary ammonium.

In Formula 1 the terms "bicycloalkyl," "bicycloalkenyl," "bicycloalkyl alkyl," and "bicycloalkenyl alkyl" will include but are not limited to:

norbornyl
norbornenyl
norbornenyl alkyl
bicyclo(2,2,2,) octyl
bicyclo (2,2,2) octenyl
bicyclo (2,2,2) octyl alkyl
bicyclo (2,2,2) octenyl alkyl
indanyl
hexahydroindenyl
tetrahydroindanyl
hexahydroindenyl alkyl
hexahydroindanyl
tetrahydroindanyl alkyl
hexahydroindanyl alkyl
hexahydro-4,7-methanoindenyl
hexahydro-4,7-methanoindenyl alkyl
hexahydro-4,7-methanoindanyl
tetrahydro-4,7-methanoindanyl
hexahydro-4,7-methanoindanyl alkyl
tetrahydro-4,7-methanoindanyl alkyl
decahydronaphthyl
decahydronaphthyl alkyl
tetrahydronaphthyl
tetrahydronaphthyl alkyl
decahydro-1,4-methanonaphthyl
decahydro-1,4-methanonaphthyl alkyl
octahydro-1,4-methanonaphthyl
octahydro-1,4-methanonaphthyl alkyl
decahydro-1,4,5,8-dimethanonaphthyl
decahydro-1,4,5,8-dimethanonaphthyl alkyl
octahydro-1,4,5,8-dimethanonaphthyl
octahydro-1,4,5,8-dimethanonaphthyl alkyl The compounds of the invention exert herbicidal activity on a broad spectrum of plants. This indicates their usefulness as general purpose weed killers or soil sterilants for control of vegetation on industrial sites and railroad ballast.

Certain of the compounds also exhibit selective herbicidal action in crops. By properly selecting a compound of the invention and a rate and time of application, weeds growing in such crops as sugar cane and sorghum can be controlled. The compounds of this invention also control aquatic plants such as algae, when dissolved in the water where these plants grow.

The amount of compound to be used in any instance will be governed by such factors as climate, the type of weed to be controlled, soil conditions, and the like, and so it is not possible to give a rate of application suitable for all situations. Generally speaking, one uses these compounds at levels of 0.25 to 3 pounds per acre for selective control in crops. Rates of 5 to 30 pounds per acre are satisfactory for general weed control. When used to control algae in ponds, tanks or pools, concentrations of from 0.5 to 5 p.p.m. are generally sufficient.

The compounds of this invention are also useful as synthetic intermediates. When reacted with aromatic diazonium salts in alkaline medium they yield brightly colored materials suitable for use as dyes or pigments.

The substituted uracils of Formula 1 can be prepared according to the reaction illustrated by the following equations:

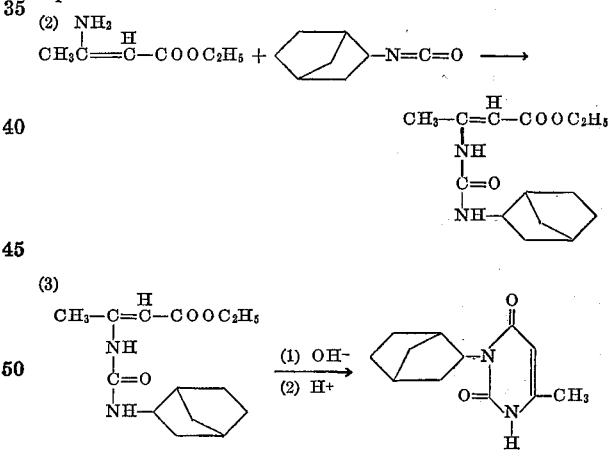

Generally, esters of β-amino-crotonic acids can be prepared by reacting the corresponding β-keto esters with aqueous ammonia [Enrod and Epstein, Ber., 20, 3054 (1887)]. The β-amino-crotonic esters are then reacted with a bicycloalkyl isocyanate in an inert solvent such as toluene or xylene for a short interval of time at reflux temperature. The reaction mixture is chilled, filtered, and the filtrate distilled to remove the solvent. Generally, a viscous liquid or solid residue remains [crude β-(3-bicycloalkylureido)-α,β-unsaturated ester] which can be reacted without further purification with an alcoholic alkaline solution at reflux temperature to bring about the desired ring closure. At this point the reaction mixture is made acidic with a strong acid such as hydrochloric acid and distilled to remove most of the alcohol. Upon chilling the remaining aqueous solution, the corresponding substituted uracil separates out as an essentially pure solid.

The ureido compounds referred to above can exist in either or both of two tautomeric forms, as illustrated in Equation 4:

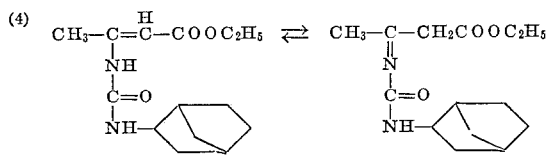

Another method for the preparation of the compounds of Formula 1 is illustrated by the following equations:

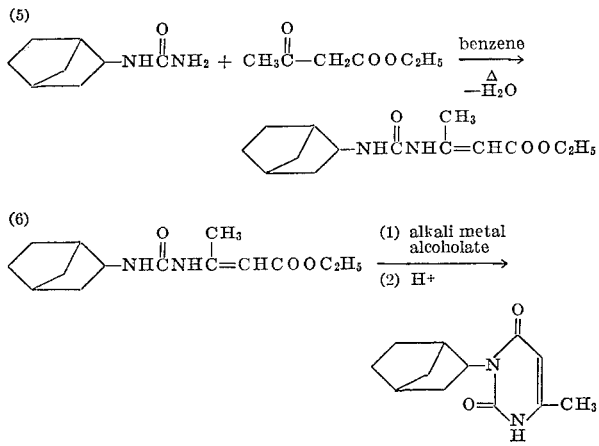

In this method, the appropriately substituted urea is reacted with an acetoacetic ester and an acid catalyst at reflux temperature in a solvent from which water is removed continuously. After all the water has been removed, the solution is stripped and taken up in ethanol containing a base, such as sodium methoxide. After a minutes reflux, the solvent is removed and the residual oil taken up in water and acidified, whereupon the desired uracil product separates in crystalline form.

The product formed after the water has been removed is the ureido compound of the type referred to in Equation 4. It can be isolated and purified if desired; however, this is not necessary nor advantageous.

The salts of the compounds of Formula 1 are prepared by dissolving the free uracil in an aqueous or nonaqueous solution of at least an equimolar amount of a base or basic salt containing the desired cation. For example, a sodium salt can be prepared by dissolving the uracil in water containing an equimolar amount of sodium hydroxide. The salt can then be isolated from the solution by removal of water.

The quaternary ammonium salts of the compounds of Formula 1 are prepared by reacting the substituted uracil with an appropriate quaternary ammonium hydroxide. Since these hydroxides are generally available in solution, the reaction is most conveniently carried out in the same solvent. The salt is isolated by removing the solvent.

Alternatively, the quaternary ammonium salts can be prepared by first preparing the sodium salt of the uracil in a dry inert solvent such as toluene or xylene. The appropriate quaternary ammonium halide is added with stirring and, if necessary, mild heating. The sodium halide which forms is removed by filtration, leaving the quaternary ammonium salt of the uracil in solution. If desired, the dry salt can be isolated by removing the solvent, preferably in vacuo.

The compounds of the invention can be prepared for herbicidal use by incorporating them with adjuvants.

The amount of herbicide in such preparations can vary over a wide range according to need. Generally speaking, they will contain from about 0.5 to 95%, by weight, of an active compound of the invention.

Powder and dust preparations can be made by mixing compounds of the invention with finely divided solids such as talcs, natural clays, pyrophyllite, diatomaceous earth; flours such as walnut shell, wheat, redwood, soya bean and cotton seed; or inorganic substances such as magnesium carbonate, calcium carbonate, calcium phosphate, sulfur and lime. These preparations are made by thoroughly blending the active ingredients and the solid. The particles in such preparations are preferably less than 50 microns in average diameter. It is often desirable to grind the active and the carrier to reduce the particle size and obtain an intimate mixture.

Water-soluble powders can be prepared by blending a suitable active with such water-soluble alkaline powders as silicates, carbonates, phosphoates or hydroxides, and optionally with water-soluble diluents such as urea or dextrose.

Granules and pellets can be made by mixing a finely divided active with a suitable clay, moistening this mixture with from 15 to 20% by weight of water, and granulating the mixture. Alternatively, the wet mass may be extruded through a suitable die under pressure. The extrusions are cut into pre-determined lengths and then dried. These pellets can be granulated if desired.

Granules or pellets can also be prepared by spraying a suspension or solution of an active onto the surface of a preformed granule of clay, vermiculite or other suitable granular material. If the active is in solution, it will penetrate into the pores of the granule and so will adhere without the aid of a binding agent. When the active material is insoluble in the liquid and is carried as a suspension, it is preferable that a binding agent such as goulac, dextrin, swollen starch, glue or polyvinyl alcohol be added. In either case, the granule is then dried and ready for use.

The compounds of the invention can also be prepared as suspension concentrates in water or in nonaqueous liquids. Among the latter, aliphatic and aromatic hydrocarbons, especially those derived from petroleum and having boiling points of from 125° C. to 400° C. are preferred. Hydrocarbons having lower boiling points should not be used because of their undesirable volatilization characteristics and flammability. These liquid preparations are made by milling the components in a mill such as pebble mill until the particles have average diameters of from 1 to 50 microns, preferably 5 to 20 microns.

The herbicidal preparations, whatever physical form they take, can also contain a surface-active agent. The surfactant renders the preparations readily dispersible in liquids and improves their action on waxy leaves and the like. For general application, surface-active agents are used in the preparations at concentrations of from about 1 to 10% by weight. Levels of from 0.5 to 6 parts of surfactant for each part of active, however, give unusual and unexpected results. Preparations having these higher levels of surfactants show greater herbicidal effectiveness than can be expected from a consideration of activity of the components used separately.

The term "surface-active agent" is intended to include wetting agents, dispersing agents, suspending agents and emulsifying agents. Surface-active agents suitable for use are set forth in "Detergents and Emulsifiers Annual—1965," John W. McCutcheon, Inc., Morristown, N.J. Other surface-active agents which can be used in these preparations are listed in U.S. Patents 2,139,276; 2,412,-510; 2,426,417; and 2,655,447.

The preparations can also contain adhesives, corrosion inhibitors, antifoam agents, dyes and pigments, anticaking agents, and hard water stabilizers.

The alkali metal salts of the compounds of Formula 1 are especially advantageous for use as herbicides because they are soluble in water and can be applied as aqueous solutions.

Herbicidal compositions incorporating compounds of this invention can be formulated to contain two or more of the uracils. They can also be formulated to contain other known herbicides in addition to the compounds of the invention to give compositions which have advantages over the components, used separately.

Among the known herbicides which can be combined with the compounds of the invention are:

*Substituted ureas*

3-(3,4-dichlorophenyl)-1,1-dimethylurea
3-(4-chlorophenyl)-1,1-dimethylurea
3-phenyl-1,1-dimethylurea
3-(3,4-dichlorophenyl)-3-methoxy-1,1-dimethylurea
3-(4-chlorophenyl)-3-methoxy-1,1-dimethylurea
3-(3,4-dichlorophenyl)-1-n-butyl-1-methylurea
3-(3,4-dichlorophenyl)-1-methoxy-1-methylurea
3-(4-chlorophenyl)-1-methoxy-1-methylurea
3-(3,4-dichlorophenyl)-1,1,3-trimethylurea
3-(3,4-dichlorophenyl)-1,1-diethylurea
3-(p-chlorophenoxyphenyl)-1,1-dimethylurea These ureas can be mixed with the compounds of this invention in proportions of from 1:6 to 4:1, respectively, the preferred ratio being 1:3 to 2:1.

*Substituted triazines*

2-chloro-4,6-bis(ethylamino)-s-triazine
2-chloro-4-ethylamino-6-isopropylamino-s-triazine
2-chloro-4,6-bis(methoxypropylamino)-s-triazine
2-methoxy-4,6-bis(isopropylamino)-s-triazine
2-diethylamino-4-isopropylacetamido-6-methoxy-s-triazine
2-isopropylamino-4-methoxyethylamino-6-methylmercapto-s-triazine
2-methylmercapto-4,6-bis(isopropylamino)-s-triazine
2-methylmercapto-4,6-bis(ethylamino)-s-triazine
2-methylmercapto-4-ethylamino-6-isopropylamino-s-triazine
2-methoxy-4,6-bis(ethylamino)-s-triazine
2-methoxy-4-ethylamino-6-isopropylamino-s-triazine
2-chloro-4,6-bis(isopropylamino)-s-triazine These triazines can be mixed with the compounds of this invention in proportions of from 1:6 to 4:1, respectively, the preferred ratio being 1:3 to 2:1.

*Phenols*

Dinitro-o-sec-butylphenol and its salts
Pentachlorophenol and its salts

These phenols can be mixed with the compounds of this invention in the proportions of 1:10 to 10:1, respectively, the preferred ratio being 1:5 to 5:1.

*Carboxylic acids and derivatives*

The following carboxylic acids and derivatives can be mixed with the compounds of this invention in the listed proportions:

A 2,3,6-trichlorobenzoic acid and its salts
2,3,5,6-tetrachlorobenzoic acid and its salts
2-methoxy-3,5,6-trichlorobenzoic acid and its salts
2-methoxy-3,6-dichlorobenzoic acid and its salts
3-amino-2,5-dichlorobenzoic acid and its salts
3-nitro-2,5-dichlorobenzoic acid and its salts
2-methyl-3,6-dichlorobenzoic acid and its salts
2,4-dichlorophenoxyacetic acid and its salts and esters
2,4,5-trichlorophenoxyacetic acid and its salts and esters
(2-methyl-4-chlorophenoxy)acetic acid and its salts and esters
2-(2,4,5-trichlorophenoxy)propionic acid and its salts and esters
2-(2,4,5-trichlorophenoxy)ethyl-2,2-dichloropropionate
4-(2,4-dichlorophenoxy)butyric acid and its salts and esters
4-(2-methyl-4-chlorophenoxy)butyric acid and its salts and esters
2,3,6-trichlorobenzyloxypropanol Mixed in a 1:20 to 8:1 ratio, preferably a 1:4 to 4:1 ratio.

B 2,6-dichlorobenzonitrile

Mixed in a 1:4 to 4:1 ratio, preferably a 1:3 to 3:1 ratio.

C

Trichloroacetic acid and its salts

Mixed in a 1:5 to 20:1 ratio, preferably a 1:2 to 6:1 ratio.

D 2,2-dichloropropionic acid and its salts

Mixed in a 1:4 to 8:1 ratio, preferably a 1:2 to 4:1 ratio.

E

N,N-di(n-propyl)thiolcarbamic acid, ethyl ester
N,N-di(n-propyl)thiolcarbamic acid, n-propyl ester
N-ethyl-N-(n-butyl)thiolcarbamic acid, ethyl ester
N-ethyl-N-(n-butyl)thiolcarbamic acid, n-propyl ester Mixed in a 1:2 to 24:1 ratio, preferably a 1:1 to 12:1 ratio.

F

N-phenylcarbamic acid, isopropyl ester
N-(m-chlorophenyl)carbamic acid, isopropyl ester
N-(m-chlorophenyl)carbamic acid, 4-chloro-2-butynyl ester Mixed in a 1:2 to 24:1 ratio, preferably a 1:1 to 12:1 ratio.

G 2,3,6-trichlorophenylacetic acid and its salts

Mixed in a 1:20 to 8:1 ratio, preferably a 1:4 to 4:1 ratio.

H 2-chloro-N,N-diallylacetamide
Maleic hydrazide

Mixed in a 1:2 to 10:1 ratio, preferably a 1:1 to 5:1 ratio.

*Inorganic and mixed inorganic-organic salts*

The following salts can be mixed with the compounds of this invention in the listed respective proportions:

A

Calcium propylarsonate
Disodium monomethylarsonate
Octyl-dodecylammoniummethylarsonate
Dimethylarsinic acid Mixed in a 1:4 to 4:1 ratio, preferably a 1:2 to 2:1 ratio.

B

Sodium arsenite

Mixed in a 1:10 to 40:1 ratio, preferably a 1:5 to 25:1 ratio.

C

Lead arsenate
Calcium arsenate

Mixed in a 150:1 to 600:1 ratio, preferably a 100:1 to 400:1 ratio.

D

Sodium tetraborate hydrated, granulated
Sodium metaborate
Sodium pentaborate
Polyborchlorate
Unrefined borate ore such as borascu Mixed in a 3:1 to 1500:1 ratio, preferably a 6:1 to 1000:1 ratio.

E

Ammonium thiocyanate

Mixed in a 1:10 to 20:1 ratio, preferably a 1:5 to 5:1 ratio.

F

Sodium chlorate

Mixed in a 1:1 to 40:1 ratio, preferably a 2:1 to 20:1 ratio.

G

Ammonium sulfamate

Mixed in a 1:1 to 100:1 ratio, preferably a 1:1 to 50:1 ratio.

Other organic herbicides

The following herbicides can be mixed with the compounds of this invention in the listed respective proportions:

A 1,1'-ethylene-2,2'-dipyridylium cation
1,1'-ethylene-4,4'-dipyridylium cation

Mixed in a 1:20 to 16:1 ratio, preferably a 1:5 to 5:1 ratio.

B 3-amino-1,2,4-triazole

Mixed in a 1:20 to 20:1 ratio, preferably a 1:5 to 5:1 ratio.

C 3,6-endoxohexahydrophthalic acid

Mixed in a 1:4 to 20:1 ratio, preferably a 1:2 to 10:1 ratio.

D

Hexachloroacetone

Mixed in a 1:2 to 16:1 ratio, preferably a 1:1 to 8:1 ratio.

E

Diphenylacetonitrile
N,N-dimethyl-α,α-diphenylacetamide
N,N-di-n-propyl-2,6-dinitro-4-trifluoromethylaniline
N,N-di-n-propyl-2,6-dinitro-4-methylaniline Mixed in a 1:10 to 30:1 ratio, preferably a 1:5 to 20:1 ratio.

F

O-(2,4-dichlorophenyl)-O-methyl-isopropyl-phosphoramidothiate
2,3,5,6-tetrachloroterephthalic acid, dimethyl ester Mixed in a 1:4 to 20:1 ratio, preferably a 1:3 to 15:1 ratio.

G 2,4-dichloro-4'-nitrodiphenyl ether
2,3,5-trichloro-4-pyridinal
4-amino-3,5,6-trichloropicolinic acid Mixed in a 1:10 to 30:1 ratio, preferably a 1:5 to 20:1 ratio.

Other substituted uracils

The compounds of the invention can also be mixed with other substituted uracils, in the respective proportions listed below.

A 3-(3a,4,5,6,7,7a-hexahydro-4,7-methano-5-indenyl)-5-bromo-6-methyluracil and salts
3-norbornyl-5-bromo-6-methyluracil and salts
3-isopropyl-5-bromo-6-methyluracil and salts
3-isopropyl-5-chloro-6-methyluracil and salts
3-sec-butyl-5-bromo-6-methyluracil and salts
3-sec-butyl-5-chloro-6-methyluracil and salts
3-cyclohexyl-5-bromo-6-methyluracil
3-cyclohexyl-5-chloro-6-methyluracil
3-tert-butyl-5-bromo-6-methyluracil
3-tert-butyl-5-chloro-6-methyluracil Mixed in a 1:4 to 4:1 ratio, preferably a 1:2 to 2:1 ratio.

B 3-cyclohexyl-5,6-trimethyleneuracil
3-sec-butyl-5,6-trimethyleneuracil
3-isopropyl-5,6-trimethyleneuracil
3-isopropyl-5,6-tetramethyleneuracil
3-isopropyl-5,6-pentamethyleneuracil Mixed in a 1:6 to 6:1 ratio, preferably a 1:4 to 4:1 ratio.

3-isopropyl-5-bromouracil
3-sec-butyl-5-bromouracil
3-sec-butyl-5-chlorouracil
3-cyclohexyl-5-bromouracil
3-cyclohexyl-5-chlorouracil Mixed in a 1:4 to 4:1 ratio, preferably a 1:2 to 2:1 ratio.

D 3-isopropyl-1-trichloromethylthio-5-bromo-6-methyluracil
3-cyclohexyl-1-trichloromethylthio-5-bromo-6-methyluracil
3-sec-butyl-1-acetyl-5-bromo-6-methyluracil
3-isopropyl-1-acetyl-5-bromo-6-methyluracil
3-isopropyl-1-trichloromethylthio-5-chloro-6-methyl uracil Mixed in a 1:4 to 4:1 ratio, preferably a 1:2 to 2:1 ratio.

E 3-isopropyl-6-methyluracil
3-sec-butyl-6-methyluracil

Mixed in a 1:4 to 4:1 ratio, preferably a 1:2 to 2:1 ratio.

Many of the above materials such as borates, arsonates and dinitro sec-butylphenol act as bacteriocides and fungicides. Addition of these compounds, or of compounds with similar action may inhibit the degradation and inactivation of the herbicidal uracils by soil microorganisms.

EXAMPLES

In order that the invention may be better understood, the following examples concerning the preparation of the compounds of the invention and the preparation and use of herbicidal compositions containing these compounds are given.

EXAMPLE 1

*Preparation of 3-norbornyl-6-methyluracil*

A mixture of 9 parts 2-norbornylurea, 200 parts benzene, ½ part 85% phosphoric acid and 10 parts ethyl acetoacetate are charged into a reactor equipped with an agitator and reflux condenser. The condenser contains a trap for containing and measuring the water evolved during the course of the reaction. The mixture is boiled under reflux for 18 hours, at which time ¾ part of water is observed in the trap. The heating is discontinued and the mixture filtered while hot. The filtrate is then boiled under reflux with 10 parts sodium methoxide for two hours, cooled and extracted with 200 parts water. Upon acidification of the aqueous extract, the desired uracil precipitates. When purified by recrystallization it is found to melt at 172–173° C.

The following compounds are similarly prepared by substituting equivalent amounts of the appropriate ureas in the following table for the norbornylurea above.

| Urea Reactant | Uracil Product |
| --- | --- |
| Norbornylmethylurea | 3-norbornylmethyl-6-methyluracil. |
| Norbornenylurea | 3-norbornenyl-6-methyluracil. |
| Norbornenylmethylurea | 3-norbornenylmethyl-6-methyluracil. |
| Bornylurea | 3-bornyl-6-methyluracil. |
| Fenchylurea | 3-fenchyl-6-methyluracil. |
| 3-propyl-2-norcamphanylurea | 3-(3-propyl-2-norcamphanyl)-6-methyluracil. |
| Bicyclo[2,2,2]oct-2-ylurea | 3-(bicyclo[2,2,2]oct-2-yl)-6-methyluracil. |
| Bicyclo[3,2,1]oct-3-ylurea | 3-(bicyclo[3,2,1]oct-3-yl)-6-methyluracil. |
| 3a,4,5,6,7,7a-hexahydro-4,7-methano-5-indenylurea. | 3-(3a,4,5,6,7,7a-hexahydro-4,7-methano-5-indenyl)-6-methyluracil. |
| Bicyclo[2,2,2]oct-2-ylmethylurea | 3-(bicyclo[2,2,2]oct-2-ylmethyl)-6-methyluracil. |
| Bicyclo[2,2,2]oct-5-en-2-ylurea | 3-(bicyclo[2,2,2]oct-5-en-2-yl)-6-methyluracil. |
| α-Ethylbicyclo[2,2,2]oct-5-enyl-methylurea. | 3-(α-ethylbicyclo[2,2,2]oct-5-enylmethyl)-6-methyluracil. |
| 3a,4,5,6,7,7a-hexahydro-1-indanylurea. | 3-(3a,4,5,6,7,7a-hexahydro-1-indanyl)-6-methyluracil. |
| 4,5,6,7-hexahydro-4,7-methanoindenylurea. | 3-(4,5,6,7-hexahydro-4,7-methanoindenyl)-6-methyluracil. |
| 2-(3a,4,5,6,7,7a-hexahydro-5-indanyl)ethylurea. | 3-[2-(3a,4,5,6,7,7a-hexahydro-5-indanyl)ethyl]-6-methyluracil. |
| Hexahydro-5-indanylmethylurea | 3-(hexahydro-5-indanylmethyl)-6-methyluracil. |
| α-Decahydronaphthalurea | 3-(α-decahydronaphthyl)-6-methyluracil. |
| β-Decahydronaphthylurea | 3-(β-decahydronaphthyl)-6-methyluracil. |
| 1,2,3,4-tetrahydronaphth-1-ylurea | 3-(1,2,3,4-tetrahydronaphth-1-yl)-6-methyluracil. |
| α-Decahydro-1,4-5,8-dimethanonaphthylmethylurea. | 3-(α-decahydro-1,4-5,8-dimethanonaphthylmethyl)-6-methyluracil. |
| 2-indanylurea | 3-(2-indanyl)-6-methyluracil. |
| (3a,4,5,6,7,7a-hexahydro-4,7-methano-5-indanyl)urea. | 3-(3a,4,5,6,7,7a-hexahydro-4,7-methano-5-indanyl)-6-methyluracil. |
| 1,2,3,4-tetrahydronaphth-2-ylurea. | 3-(1,2,3,4-tetrahydronaphth-2-yl)-6-methyluracil. |

EXAMPLE 2

*Preparation of 3-(2-indanyl)-6-methyluracil, sodium salt*

A solution of 4 parts of sodium hydroxide in 100 parts of water is treated with 20.8 parts of 3-(2-indanyl)-6-methyluracil. The water is removed from the resulting solution under reduced pressure, leaving 3-(2-indanyl)-6-methyluracil, sodium salt as a dihydrate.

The alkali metal and quaternary ammonium salts of the compounds of Example 1 and those compounds listed thereafter, can be similarly prepared by substituting equivalent amounts of the alkali metal quaternary ammonium hydroxides and equivalent amounts of the substituted uracils for the sodium hydroxide and 3-(2-indanyl)-6-methyluracil in Example 2 above.

A typical example would be the tetramethylammonium salt of 2-indanyl-6-methyluracil.

HERBICIDAL COMPOSITIONS

EXAMPLE 3

*Aqueous suspension*

The following composition is mixed and pebble-milled or sand-milled until the particles of active material are under 5 microns in diameter. The resulting stable, thixotropic suspension does not cake on storage and is easily diluted with water to form a slow settling suspension which requires no agitation during application.

| | Percent |
| --- | --- |
| 3-2-norbornyl-6-methyluracil | 28.0 |
| Sodium lignin sulfonate | 15.0 |
| Hydrated attapulgite | 2.0 |
| Disodium phosphate | 0.8 |
| Sodium pentachlorophenate | 0.5 |
| Water | 53.7 |

When applied as a directed spray in 30 gallons of water, at a concentration of 2 pounds of active ingredient per acre, this suspension is useful for pre-emergence control of crabgrass, mustard species, lambsquarters, cocklebur, and Johnsongrass in sugar cane.

EXAMPLE 4

*Aqueous dispersion*

| | Percent |
| --- | --- |
| 3-isobornyl-6-methyluracil | 20.00 |
| 2-chloro-4-ethylamino-6-isopropylamino-s-triazine | 10.00 |
| Sodium lignin sulfonate | 15.00 |
| Hydrated attapulgite | 1.75 |
| $Na_2HPO_4$ | 0.80 |
| Water | 52.45 |

The ingredients are mixed and sand-ground or ball-milled until the particles are less than 10 microns in size.

One to two gallons of this formulation is dispersed in 60 gallons of water and sprayed in early spring on one acre of sugar cane that has been shaved and off-barred. Good control of seedling Johnsongrass, wild lettuce, crabgrass, pigweed, ragweed, spoted spurge, black nightshade, and foxtail is obtained.

EXAMPLE 5

*Aqueous dispersion*

| | Percent |
| --- | --- |
| 3-(inden-5-yl)-6-methyluracil | 25.00 |
| 3-amino-1,2,4-triazole | 8.00 |
| Sodium lignin sulfonate | 15.00 |
| Hydrated attapulgite | 1.75 |
| Water | 50.25 |

These components are mixed and ball-milled until the uracil particles are below 10 microns in size. The triazole dissolves to form a true solution.

This formulation is dispersed in water and sprayed at the rate of 20 pounds of active ingredients per acre in and around a transformer station to kill a dense growth of poison ivy, brambles, bouncing Bet, panic grass, and giant foxtail. The area remains free of weeds for an extended period.

EXAMPLE 6

*Oil dispersion*

| | Percent |
| --- | --- |
| (2-bicyclo[2,2,3]nonane)-6-methyluracil | 15 |
| 3-(3,4-dichlorophenyl)-1,1-dimethylurea | 15 |
| Dormant or Summer Spray Oil (Sovaspray No. 3) | 67 |
| Oil-soluble lecithin | 3 |

These components are mixed and ball-milled or sand-milled until the particles are under 10 microns in size.

This formulation is dispersed in 75 gallons of herbicidal oil and sprayed on an area surrounding oil storage tanks at 20 to 30 pounds of active ingredients per acre. The existing weed population of Bermudagrass, Johnsongrass, horse nettle, black-eyed Susan, cocklebur, fall pinicum, water grass, and panic grass is killed and the sprayed area remains free of weeds for an extended period.

EXAMPLE 7

*Granules*

| | Percent |
| --- | --- |
| 3-norbornyl-6-methyluracil | 4 |
| Sodium chlorate | 40 |
| Sodium metaobrate | 58 |
| Impurities | 2 |

A mixture of sodium chlorate, sodium metaborate and uracil is placed in a blender and blended. When this formulation is homogeneous, it is tumble-dried to give nonsegregating granules.

These granules are applied with a cyclone seeder at the rate of 1.25 pounds per 100 square feet to the area around stacks of lumber in a lumber yard for excellent control of Johnsongrass, leafy spurge, toad flax, Jimson weed, horse nettle, dandelion, plantain, crabgrass, and bindweed. The area remains weed-free for several months.

EXAMPLE 8

Granules

| | Percent |
|---|---|
| 3-norbornyl-6-methyluracil | 12.5 |
| 3-(p-chlorophenyl)-1,1-dimethylurea | 12.5 |
| Alkyl naphthalene sulfonic acid | 1.0 |
| Ca, Mg sub-bentonite | 32.0 |
| Kaolin clay | 32.0 |
| Sodium lignin sulfonate | 10.0 |

These ingredients are blended, micropulverized, mixed in a pug mill with 15-20% water, and then moist-granulated. The granules are dried and screened to minus 8 plus 30 mesh.

This formulation keeps the fenced enclosure around a radar installation free of weeds. An annual application spread by hand at the rate of 4 pounds per 1000 square feet gives excellent control of such weeds as honeysuckle, Johnsongrass, Bermuda grass, big bluestem, brambles, and golden rod.

EXAMPLE 9

Wetabble powder

A wettable powder is prepared by blending the following components, micropulverizing them until the particles are below 50 microns in size and then reblending:

| | Percent |
|---|---|
| 3-bornyl-6-methyluracil | 80.00 |
| Alkyl naphthalene sulfonic acid, sodium salt | 1.75 |
| Low viscosity methylcellulose | 0.25 |
| Disodium phosphate (corrosion inhibitor) | 0.80 |
| Attapulgite clay | 17.20 |

This wettable powder formulation is used for control of vegetation on industrial sites and railroad ballast. When applied at 10 to 20 pounds of active ingredient per acre in 100 gallons of water, excellent control of lambsquarters, goldenrod, evening primrose, pokeweed, ox-eye daisy, cocklebur, goose grass, crabgrass, broom sedge, and love grass is obtained.

When a surfactant such as an alkylphenyl polyethylene glycol ether is added to the spray mixture described above, excellent contact action is obtained.

The following uracils can be formulated according to the same procedure, by substituting herbicidally equivalent amounts of the listed actives for 3-bornyl-6-methyluracil. Excellent weed control results are obtained.

3-norbornyl-6-methyluracil
3-(3a,4,5,6,7,7a-hexahydro-4,7-methano-5-indenyl)-6-methyluracil
3-(3a,4,5,6,7,7a-hexahydro-4,7-methano-5-indanyl)-6-methyluracil
3-nornbornenyl-6-methyluracil
3-(α-decahydronaphthyl)-6-methyluracil

EXAMPLE 10

Water soluble powder

| | Percent |
|---|---|
| 3-(2-norbornylmethyl)-6-methyluracil | 40 |
| Sodium metasilicate | 40 |
| Potassium carbonate | 15 |
| Sodium dioctyl sulfosuccinate | 1 |
| Finely divided synthetic silica | 2 |
| Urea | 2 |

These ingredients are blended, micropulverized until the average particle size is below 50 mesh, and are then reblended until homogeneous.

Eight pounds (active) of this formulation are added to 80 gallons of water and applied, at the rate of 80 gallons per acre, to young weeds growing along roadsides. Excellent control of fall panicum, crabgrass, purslane, foxtail, velvet leaf, and pigweed is obtained.

What is claimed is:

1. A compound selected from the group consisting of
   (a) compounds of the formula

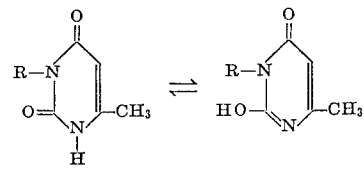

where:
   R is selected from the the group consisting of bicycloalkyl of 7 through 12 carbon atoms, bicycloalkenyl of 7 through 12 carbon atoms, bicycloalkyl alkyl of 8 through 13 carbon atoms and bicycloalkenyl alkyl of 8 through 13 carbon atoms; and (b) the sodium, potassium, lithium and lower alkyl quaternary ammonium salts of the compounds in (a).

2. 3-norbornyl-6-methyluracil.
3. 3-norbornenyl-6-methyluracil.
4. 3-(4,5,6,7-hexahydro-4,7-methanoindenyl)-6-methyluracil.

References Cited

Senda et al., Chem. Abstracts, vol. 53, 1959, pp. 10,237–10,238, QD1–A51. (Abstracts of Chem. Pharm. Bull., vol. 6, pp. 479–482, 1958).

NICHOLAS S. RIZZO, *Primary Examiner.*

ALEX MAZEL, *Examiner.*

M. O'BRIEN, F. A. MIKA, *Assistant Examiners.*